March 21, 1939.   M. P. CHAPLIN   2,150,910
PULP ARTICLE AND METHOD OF MANUFACTURE
Filed April 9, 1937

INVENTOR.
Merle P. Chaplin
BY Spear Rawlings & Spear
ATTORNEYS.

Patented Mar. 21, 1939

2,150,910

UNITED STATES PATENT OFFICE 2,150,910

PULP ARTICLE AND METHOD OF MANUFACTURE

Merle P. Chaplin, South Portland, Maine, assignor, by mesne assignments, to The Canal National Bank of Portland, Portland, Maine, a national banking association Application April 9, 1937, Serial No. 135,906

5 Claims. (Cl. 92—56)

This invention relates to a new article of manufacture, moulded from cellulose materials having special characteristics, produced by a method which is simple and inexpensive, resulting in an article having useful and unique characteristics.

The article produced by the method hereinafter disclosed may be in the form of a plate, dish, or like container and is particularly adapted for use in the cooking, serving or storing of foods and food products and more particularly those which contain oils, fats and greases.

A further useful and valuable purpose served by the article of this invention, is that its low cost permits it to be discarded after single use avoiding the necessity of cleaning or washing a container, the cost of which necessitates its being used over and over again. This is particularly desirable where the container is used for the cooking of certain foods which become gummy or sticky during the cooking process and which adhere to the utensil in which they are prepared.

Various solutions to the problems of producing an inexpensive container for the above purposes have been suggested but all fall short of the desired result.

Some of the expedients suggested include the use of expensive chemicals for treating or impregnating the material of the container either before, during or after manufacture. Other expedients include the introduction of non-cellulosic materials such as glue, infusorial earths, alkaline or other fillers, either mixed with the cellulose materials or used as a film or layer.

Other materials include aluminum and titanium silicate as well as the sulphates of aluminum, iron, sodium and other materials. Most of these materials require that the article be impregnated therewith for a period of time and subsequently dried, some materials requiring two or more impregnations with subsequent drying.

Some other suggested expedients include the cutting out of paper blanks and the coating of these blanks with pigments, paints, casein, rosin, silicates and other materials, and the assembly of these blanks under pressure to form the desired article. This method is not only wasteful of material but involves costly manufacturing operations.

Another expedient is to coat the surface of a previously formed and dried plate or dish, with an enamel or other coating attempting by this means to protect the article from attack and disintegration by the food products which it must be adapted to resist. Various other processes and materials and substances have been suggested, these being too numerous to mention.

Peculiarly enough, one of the most useful and efficient materials for resisting and retaining food products either hot or cold, and particularly those products which are greasy or oily, is cellulose itself, which has been treated until it is partly or wholly gelatinized. This gelatinized or gel-like material will, when dry effectively resist the attack of the oils, greases and moisture of food products and what is equally important is that this material contains no contaminating matter which may affect the quality of any food product with which it comes in contact, as is the case with many of the chemicals and extraneous materials utilized as fillers, liners, or to protect the surface of food containers.

While gelatinized cellulose is peculiarly adapted and extremely useful in connection with containers for food products, its behavior during manufacture into, or as a part of a container, has presented annoying manufacturing difficulties.

This gelatinized cellulose material tends to shrink abnormally while drying and this abnormal shrinkage causes any article made from it to ordinarily become badly distorted, warped and so changed in shape as to be unsatisfactory for any useful purpose. This is particularly true when this gelatinized cellulose material is used either to make the entire container or a substantial part of it.

A method has been found, however, to obviate this particular difficulty, which is the method of this invention. The article produced by this method is simple and inexpensive to manufacture and fulfills the requirements long sought for but not previously obtained.

Reference is made to the following figures illustrative of the article and method of my invention.

Figure 1:
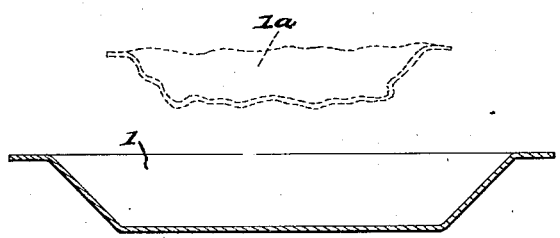
Fig. 1 shows the portion of the article made from gelatinized cellulose materials.

Preferably I die-mould both the gelatinized material 1, of Fig. 1, and the base or body material 2 on separate foraminous dies by any convenient method. When so formed I prepare the gelatinized material in such a manner that a certain portion of the fibre structure of the original cellulose is retained while reducing to gel-like form a sufficient portion or part of the material to insure the food resisting characteristics necessary for my object. This enables me to die-mould on a foraminous die a sufficient quantity of gelatinized cellulose for my purpose by virtue of the fact that the fibre structure which I have retained in the preparation of this material forms a filter-mat on which the finely divided or gel-like portion is retained and which otherwise would pass through the foraminous die.

While this is my preferred method of producing the part of my article indicated at 1, I do not, however, commit myself exclusively to this method. I may deposit this gelatinized material directly upon the previously formed body portion 2, by utilizing this body portion 2, as a filter-mat, drawing thereon by suction or vacuum applied to one surface of body portion a film or layer of the gelatinized material on the other or exposed surface. Or, I may deposit on this body portion or on a separate form or die, a layer of this material by means other than suction formation, such as spraying or similar means.

Figure 3:
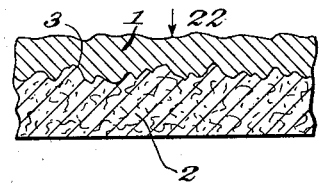
Fig. 3 is an enlarged sectional view through the material of Figs. 1 and 2 after they have been pressed together.
Figure 2:
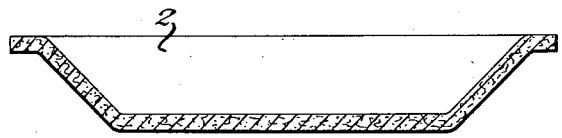
Fig. 2 shows the body portion of the article which can be made from any inexpensive fibrous or similar material.

Regardless of how I may form either of the layers 1 or 2, I subsequently join them together as indicated in Fig. 3. The body layer 2 adjacent to the gelatinized material 1, is left rough and somewhat uneven as indicated at 3, for purposes hereinafter explained.

Figure 4:
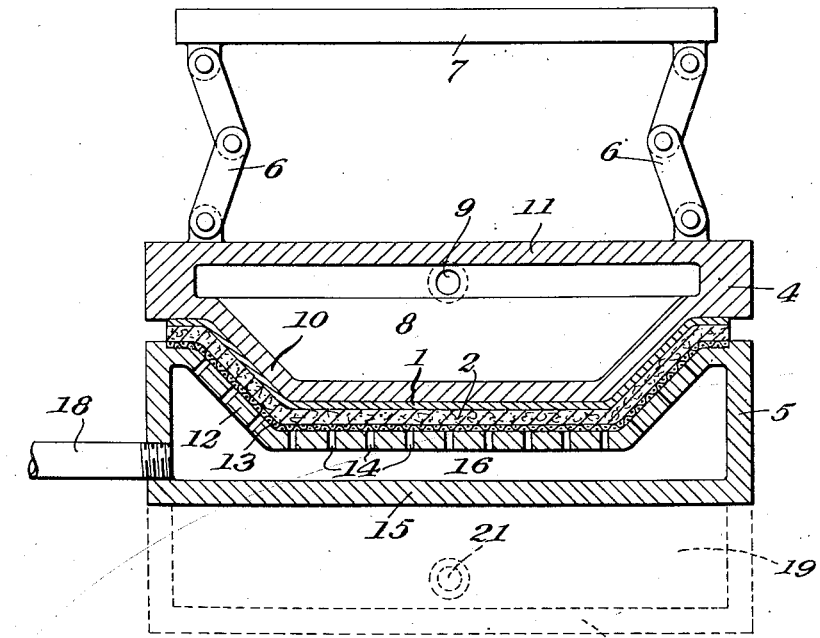
Fig. 4 illustrates a mechanism and method by which the materials of Figs. 1 and 2 are united, bonded, dried and finished to form the container or other article.
Figure 5:
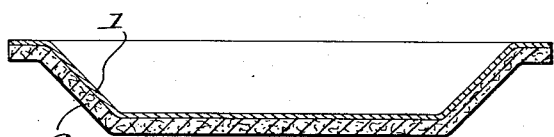
Fig. 5 is a cross-sectional view through the finished article.

Having placed the two layers 1 and 2 together I now compress these layers in any suitable device. One such device is illustrated in Fig. 4. In this figure the two layers 1 and 2 are shown compressed between dies 4 and 5. Pressure may be applied by any suitable means such as toggle levers 6, operating between the die 4 and a fixed abutment 7. This, or any other suitable means may be utilized to place pressure on the article interposed between the dies 4 and 5.

To facilitate the evaporation and removal of moisture contained in the portions 1 and 2 I may apply heat in any suitable manner to the dies which compress the article. As shown, die 4 is provided with a chamber 8, in which heating means may be introduced through pipe 9. The die 4 consists of an inner wall 10, the exterior surface of which conforms to the desired finished shape of the inside of the article. The chamber 8 is enclosed by an outer wall 11 so that pressure can be established in the chamber 8 should this be desirable.

In order that the two portions from which this article is to be made, are firmly held under compression and against the wall 10 of die 4 I provide a second die 5 having an interior wall 12, the outside of which may be covered with a perforated material 13 through which the evaporated moisture escapes passing through holes 14 in the inner wall 12 of the die 5. A chamber 16 is provided this being closed between the inner wall 12 and the outer wall 15. The moisture of evaporation escapes through holes 14 in the inner wall 12 into the chamber 16 from which it may escape or be drawn off through the pipe 18.

If desired, I may apply heat to the die 5 to assist in evaporation by the addition of a heating chamber 19, enclosed between the walls 15 and a new outer wall 20. This chamber may be heated by vapor introduced through pipe 21 or any other convenient means.

It has already been mentioned that the material utilized for part 1 of the article shrinks greatly when the water contained in this material is removed by drying. The body or base material 2 has negligible shrinkage on drying and there is indicated somewhat diagrammatically by the dotted line 1—A in Fig. 1 the relative size of portion 1 were it allowed or permitted to dry naturally.

It has also been pointed out that the exterior surface 3 of part 2 of the article is intentionally left somewhat rough and uneven and against and on this rough surface under considerable pressure the portion 1 is held as has already been described and illustrated in Fig. 4.

Now as already stated, the characteristics of the material which I use for Fig. 1 are such that this material will shrink and must be allowed to do so but of course, if allowed to shrink normally as illustrated at 1—A of Fig. 1 it would have no utility or value for the article of which it forms a part.

Consequently instead of allowing or permitting this gelatinized material 1 to shrink normally, it is held under pressure and heat against a relatively rough and uneven pulp surface, so that the necessary shrinkage which this material must have will be only in the direction of the thickness of the article as indicated by the arrow 22 in Fig. 3. The pressure on this portion of the article during drying imparted by the die 4 is in the nature of an ironing pressure which imparts to the layer 1 a substantially smooth ironed surface. The heat and pressure is sufficient to bond the layers 1 and 2 and dry the article without appreciable distortion or appreciable shrinkage thereof in a direction coextensive with the surface of the article. In this bonding and drying action the roughness of the surface 3 with which this layer 1 is in contact, prevents it from shrinking in whole or in any part thereof, parallel to its surface but shrinkage is only permitted in the direction of thickness or in the direction of the arrow 22. As the moisture leaves part 1 this layer grows thinner and the dies 4 and 5 come closer together following up the shrinkage of layer 1 insuring that it not only remains in intimate contact with layer 2 but that no part of it be allowed to move or change its position which would result in a rupture or crack in its surface destroying its utility for the purpose intended.

Figure 6:
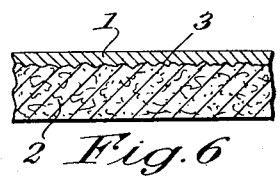
Fig. 6 is an enlarged cross-sectional view through a portion of the finished article.

In Fig. 6 there is illustrated an enlarged cross section through the finished article, after the layer 1 by compression and heat, has been reduced in thickness to make up for its natural shrinkage remaining firmly in contact with the base sheet 2 throughout the surface and area of the finished article. It is important that the part 1 be held firmly with the roughened part 2 until all or practically all of the moisture has been evaporated, otherwise part 1 may become loosened from part 2 even though only a small fraction of moisture remains therein.

I am aware that various suggestions have been made as to the use of gelatinized cellulose materials as a surface coating for flat sheets of paper or thin board. These suggestions and disclosures failed utterly to indicate or even to suggest any method by which two materials of widely varying shrinkage characteristics can be firmly affixed to each other in a simple manner. It is equally obvious that even if flat sheets of paper or board employing material of this invention were available that this board could not be formed satisfactorily into a dish or container without destroying its utility and rupturing one or more of the layers of which the board might be made up. Hence, the various suggestions previously mentioned for applying adhesive to previously cut sheets and of forming these sheets up into the container.

The simplicity of the materials selected together with the development of a method of successfully utilizing the value of these materials has resulted in the production of a new product of great commercial value and utility.

Having thus described my invention, what I desire to claim is—

1. The method of manufacturing a multi-layer molded pulp contoured article as a plate, dish, cup or other shaped article, which comprises forming from fibrous pulp a plurality of wet article layers corresponding substantially in size and shape to the size and shape of the ultimate article, one of said layers being composed in part at least of cellulosic fibrous material of gel-like characteristic which layer when dried effectively resists penetration of moisture grease and oil therethrough, uniting said layers in superimposed order as a composite article, and confining the composite article between a pair of dies substantially corresponding in size and shape to the formed article layers while simultaneously applying sufficient heat and pressure over substantially the entire surface of the article to bond the layers and dry the article without appreciable distortion or appreciable shrinkage thereof in a direction coextensive with the surface of the article.

2. The method of claim 1, the article layers being independently formed on independent contoured foraminous forming dies.

3. The method of claim 1, the article layers being successively formed on a single contoured foraminous forming die.

4. The method of claim 1, and the step of exhausting from one of said dies the water or water vapors given off by the drying article during the drying period.

5. An individual multi-layer molded pulp article of dished shape, consisting of a plurality of superimposed pre-shaped fibrous layers, one of said layers being composed of gel-like fibrous material which in dried state forms a hard, tough but flexible layer effectively resisting penetration of moisture, grease and oil, said last named layer being partly forced into the surface of the other layer and exhibiting a substantially smooth ironed surface.

MERLE P. CHAPLIN.